US009776596B2

(12) United States Patent
Jung

(10) Patent No.: US 9,776,596 B2
(45) Date of Patent: Oct. 3, 2017

(54) SEAT BELT FOR VEHICLE

(71) Applicant: HYUNDAI MOTOR COMPANY, Seoul (KR)

(72) Inventor: Chang Bin Jung, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 129 days.

(21) Appl. No.: 14/873,001

(22) Filed: Oct. 1, 2015

(65) Prior Publication Data
US 2016/0159317 A1 Jun. 9, 2016

(30) Foreign Application Priority Data
Dec. 5, 2014 (KR) ........................ 10-2014-0173602

(51) Int. Cl.
*B60R 22/195* (2006.01)
*A44B 11/25* (2006.01)
*B60R 22/26* (2006.01)
*B60R 22/18* (2006.01)

(52) U.S. Cl.
CPC ...... *B60R 22/1955* (2013.01); *A44B 11/2549* (2013.01); *B60R 22/195* (2013.01); *B60R 22/26* (2013.01); *A44B 11/2523* (2013.01); *B60R 2022/1806* (2013.01)

(58) Field of Classification Search
CPC ... B60R 22/1955; B60R 22/26; B60R 22/195; B60R 2022/1806; A44B 11/2549; A44B 11/2523
See application file for complete search history.

(56) References Cited

U.S. PATENT DOCUMENTS

2016/0159317 A1* 6/2016 Jung .................... B60R 22/1955
297/472

FOREIGN PATENT DOCUMENTS

| JP | 11-321559 A | 11/1999 | |
| JP | 2007-190944 A | 8/2007 | |
| JP | 2009-196508 A | 9/2009 | |
| JP | 2014181011 A * | 9/2014 | |
| KR | 1998-0007688 U | 4/1998 | |
| KR | 1998-021605 A | 6/1998 | |
| KR | 1998-052941 U | 10/1998 | |
| KR | 10-2005-0117743 A | 12/2005 | |
| KR | 10-1553328 B1 * | 9/2015 | ............. B60R 22/12 |

OTHER PUBLICATIONS

Huh et al. KR 10-1553328-B1 4 Point Seat Belt Module, Sep. 2015; ip.com English Translation.*

* cited by examiner

Primary Examiner — Karen Beck
(74) Attorney, Agent, or Firm — McDermott Will & Emery LLP

(57) ABSTRACT

A seat belt for a vehicle comprises a first tongue coupled to a first webbing, the first webbing configured to cover portions of a shoulder, a chest, and an abdomen of a passenger; a first buckle coupled to the first tongue; a second tongue coupled to a second webbing, the second webbing configured to cover portions of the abdomen of the passenger; a second buckle coupled to the second tongue; and an actuator configured to upwardly pull the first tongue and the first buckle, wherein the first buckle is coupled to the second buckle; and upon a collision of the vehicle, the actuator operates to separate the first buckle from the second buckle, and the first webbing moves upward, restricting a movement of an upper body of the passenger.

8 Claims, 5 Drawing Sheets

[ BEFORE OPERATION OF GAS CHAMBER ]

[ AFTER OPERATION OF GAS CHAMBER ]

[ WHEN SHOULDER DOES NOT ESCAPE FROM SEAT BELT ]

[ WHEN SHOULDER ESCAPE FROM SEAT BELT ]

SEAT BELT FOR VEHICLE

CROSS-REFERENCE TO RELATED APPLICATION

This application claims under 35 U.S.C. §119(a) the benefit of priority to Korean Patent Application No. 10-2014-0173602, filed Dec. 5, 2014, the entire content of which is incorporated herein by reference.

TECHNICAL FIELD

The present disclosure relates to a seat belt for a vehicle. More particularly, the present disclosure relates to a seat belt that can efficiently restrict the lateral movement of a passenger when a vehicle crashes in an oblique direction.

BACKGROUND

The current three-point seat belt structure is efficient in restricting the movement of a passenger who is deviating toward the front side upon a frontal crash, but has difficulty in maximizing a binding force upon crashes other than the frontal crash.

In a representative example of a new oblique crash test which the National Highway Traffic Safety Administration (NHTSA) will be introducing in 2017, a phenomenon that the shoulder of a dummy escapes from the passenger seat by lateral inertia occurring by the impact of an opposite vehicle colliding in an oblique direction is commonly observed.

When an impact occurs in a left oblique direction of the driver's seat in the new oblique crash test, all occupants of driver's seat and passenger's seat undergo an eccentric inertia in the left (or right) direction. In this case, the driver may receive help from the curtain airbag and the door trim that are located outside the drivers seat, and may not be affected by the shoulder fastening direction of the three-point seat belt.

However, when an occupant of the passenger's seat undergoes the eccentric inertia in the left direction (inner direction of the occupant), the shoulder of the occupant may escape from the seat belt because the direction of the shoulder fastening direction of the passenger is opposite to that of the driver (see FIG. 6A and FIG. 6B).

Due to the shoulder escaping from the seat belt, injury may significantly increase because of the rotation and the lateral behavior of the head/upper body, leading to significant reduction of points upon crash test and serious losses to a company in field accidents besides the crash test.

Accordingly, a new belt restriction structure that can restrict the lateral movement even when the shoulder escapes is needed.

The above information disclosed in this Background section is only for enhancement of understanding of the background of the disclosure and therefore it may contain information that does not form the prior art that is already known in this country to a person of ordinary skill in the art.

SUMMARY

The present disclosure provides a seat belt for a vehicle that can significantly improve the prevention of injuries to a passenger caused by separation of the shoulder from the seat belt upon collision and can also comply with new North American crash-related regulations, by implementing a new concept for a seat belt structure that restricts lateral movement, and that allows webbing of the seat belt passing the shoulder and chest of a passenger to upwardly move upon new oblique collision of a vehicle and thus effectively restricts the lateral movement of a passenger.

In one aspect, the present inventive concept provides a seat belt for a vehicle, comprising a first tongue coupled to a first webbing, the first webbing configured to cover portions of a shoulder, a chest, and an abdomen of a passenger; a first buckle coupled to the first tongue; a second tongue coupled to a second webbing, the second webbing configured to cover portions of the abdomen of the passenger; a second buckle coupled to the second tongue; and an actuator configured to upwardly pull the first tongue and the first buckle, wherein the first buckle is coupled to the second buckle; and upon a collision of the vehicle, the actuator operates to separate the first buckle from the second buckle, and the first webbing moves upward, restricting a movement of an upper body of the passenger.

The first tongue and the first buckle may be coupled to the second tongue and the second buckle by a molding pin disposed between the first buckle and the second buckle, and when a sufficient force is applied, the molding pin breaks, separating the first tongue and the first buckle from the second tongue and the second buckle.

The first buckle may be connected to a strap extending from a piston rod of the actuator, such that the first tongue and the first buckle are pulled by the strap when the actuator operates.

The second buckle may comprise a push button mounted therein, the push button configured to release the first tongue and the second tongue when the push button is pushed.

A first locking lever may be configured to couple to the first tongue and a second locking lever configured to couple to the second tongue, wherein the push button is configured to release the tongues from the locking levers when the push button is pushed.

The first webbing may be configured to extend from a retractor through a D-ring and the first tongue to a lower anchor disposed on the same side of the vehicle as the retractor.

The second webbing may be configured to extend from the lower anchor to the second tongue.

The actuator may comprise a pneumatic actuator that expands rapidly upon a collision signal.

Other aspects and exemplary embodiments of the inventive concept are discussed infra.

BRIEF DESCRIPTION OF THE DRAWINGS

The above and other features of the present inventive concept will now be described in detail with reference to certain exemplary embodiments thereof illustrated in the accompanying drawings which are given hereinbelow by way of illustration only, and thus are not limitative of the present inventive concept, and wherein.

Figure 1:
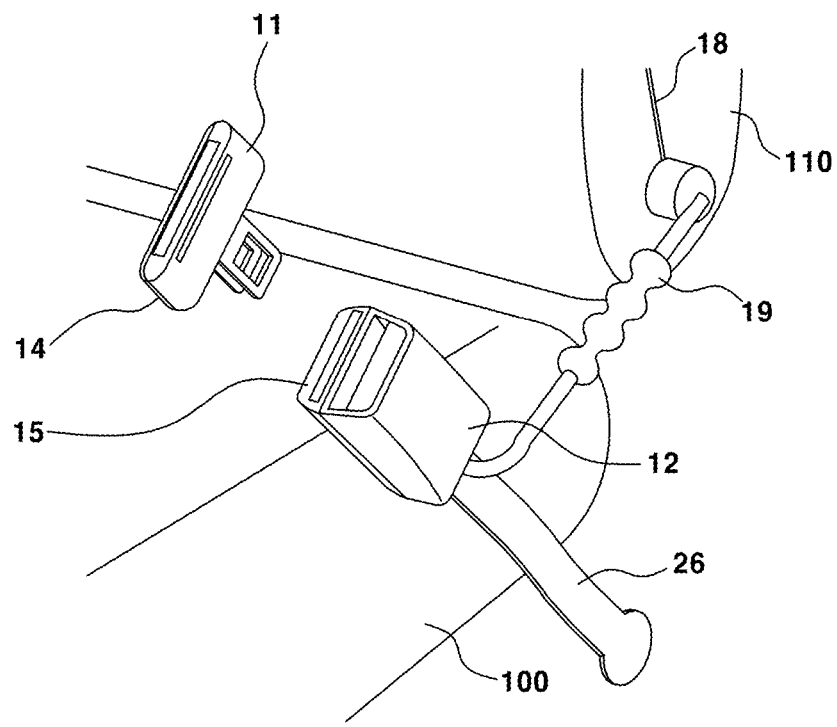
FIG. 1 is a perspective view illustrating a seat belt according to an embodiment of the present inventive concept.

It should be understood that the accompanying drawings are not necessarily to scale, presenting a somewhat simplified representation of various exemplary features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the inventive concept are discussed infra.

Hereinafter, exemplary embodiments of the present inventive concept will be described in detail with reference to the accompanying drawings so that those skilled in the art can easily carry out the present inventive concept.

FIG. 1 is a perspective view illustrating a seat belt according to an embodiment of the present inventive concept.

As shown in FIG. 1, a tongue and a buckle of a dual type are shown.

A first tongue 11 connected to a first webbing (10 in FIGS. 4 and 5) covering the shoulder, chest, and abdomen of a passenger and a second tongue 14 connected to a second webbing (13 in FIGS. 4 and 5) covering the abdomen of a passenger may be integrally coupled to each other while the rear surfaces thereof make contact with each other.

Also, a first buckle 12 and a second buckle 15 to be coupled to the first tongue 11 and the second tongue, respectively, may be integrally coupled to each other while the rear surfaces thereof make contact with each other.

In this case, the second buckle 15 may be connected to the upper end of a buckle strap 26 at one side of a seat cushion 100, and thus the first buckle 12 and the second buckle 15 that are integral type may be supported by the buckle strap 26, the lower end of which is fixed to an anchor mount (not shown) located at the outside.

Also, the first buckle 12 may be connected to a strap 19 extending from the lower end of the side surface of a seat back 110.

That is, the first buckle 12 may be supported by the side of the seat back 110, and may be connected with a strap (wire) structure so as not to be affected by seating position and buckle position.

The strap 19 may be connected to a piston rod 27 of an actuator 16 described later, and may move in accordance with the operation of the piston rod 27.

Also, the strap 19 may be implemented in a bellows-type which enables a slight length adjustment of the strap 19 such that an interference does not occur even when the seat back leans back or stands up.

Here, a seatback slit 18 may be formed in the side surface of the seat back 100 in order to secure the moving path of the strap 19. The strap 19 may move up along the seatback slit 18.

In the seatback slit 18, a notch may be formed in a seat covering, and an internal seat foam may be cut, allowing the strap 19 to move while tearing down the notch.

In such a dual type of tongue and buckle structure, one webbing may be fixed to the current location, and the other webbing may move up upon the vehicle collision.

For example, the second tongue 14 and the second buckle 15 may remain in their locations, and the first tongue 11 and the first buckle 12 may be separated from the second tongue 14 and the second buckle 15 and may move upward.

Accordingly, upon vehicle collision, and in particularly, upon an oblique crash, the first tongue and the first buckle may be separated from the second tongue and the second buckle by the operation of the actuator, and simultaneously, the first webbing may move upward, restricting the movement of the upper body of a passenger and thus preventing the shoulder of a passenger from escaping from the seat belt.

Here, the reference numeral 20 may be a push button for releasing the coupling state between the tongue and the buckle.

Figure 2:
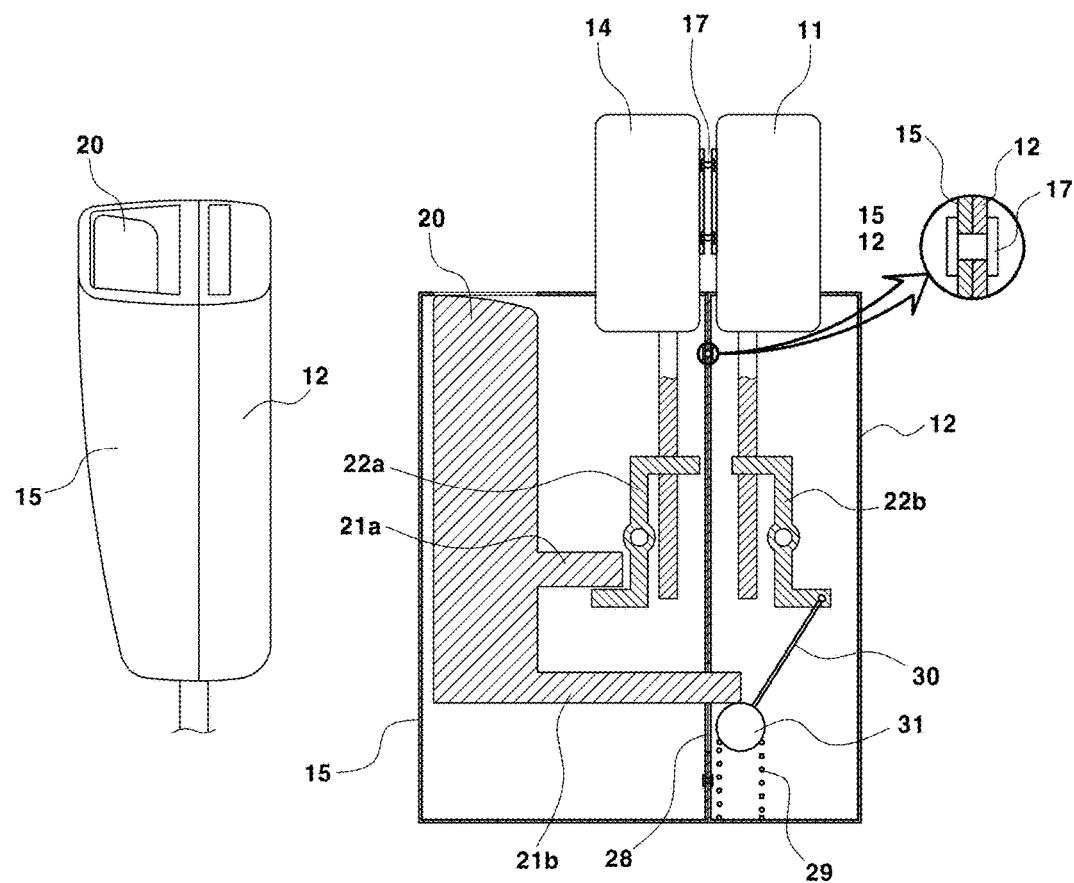
FIG. 2 is perspective and cross-sectional views illustrating a dual tongue/buckle structure of a seat belt according to an embodiment of the present inventive concept.

FIG. 2 shows perspective and cross-sectional views illustrating a dual tongue/buckle structure of a seat belt according to an embodiment of the present inventive concept.

As shown in FIG. 2, the first tongue 11 and the first buckle 12 may be integrally connected to the second tongue 14 and the second buckle 15 by a molding pin 17 interposed between the contact surfaces thereof.

The molding pin connection part may be formed on about two places at the side of the tongue and on about three places at the side of the buckle, and may be formed of a plastic material so as to be easily broken when a certain load is applied thereto. The molding pin may be coupled while buckle bases are making contact with each other before part assembly in the buckle and buckle cover finishing.

Here, the molding pin may include a capsule (molding pin) that prevents a certain shrinkage phenomenon of a current column.

The capsule attached to the current column may be designed such that the shear limit load becomes about 35 kgf to about 40 kgf, and may not be separated under ordinary conditions.

The shear limit load assigned to the capsule that is being applied to the column may be assigned to the molding pin.

For example, the actuator that moves up the first buckle upon collision may use the same device as a pre-tensioner of seat belt retractor/anchor, and when a shear load of about 2 kN and about 200 kgf is applied in an existing test, the molding pin may be broken, inducing separation.

Accordingly, when an external force of about 200 kgf is applied, the molding pin 17 may be broken, separating the first tongue 11 and the first buckle 12 from the second tongue 14 and the second buckle 15.

Meanwhile, the release principle of basic coupling between the tongue and the buckle may be identical to the existing release principle of coupling between tongue and buckle.

For example, the push button 20 may be mounted in the second buckle 15 in order to release the tongue. In this case, two push pieces 21a and 21b extending from a lower portion of the push button 20 in a horizontal direction may be formed.

Here, a lower push piece 21b of the two push pieces 21a and 21b may extend longer than the upper push piece 21a so as to release the coupling between the first tongue 11 and the first buckle 12, and may extend to the inside of the first buckle 12 through a slit 28 of a vertical cut form in the first buckle 12.

Also, a connection rod 31 may be disposed to be supported by a spring 29 in the first buckle 12 and be connected to a locking lever 22b in the first buckle 12 through a connection rod strap 30. The end portion of the push piece 21b may be disposed on and make contact with the upper portion of the connection rod.

Thus, when the push button 20 is pushed, the upper push piece 21a may directly push the lower end portion of the locking lever 22a hooking the second tongue 14, and the lower push piece 21b may push the connection rod and simultaneously, the lower end portion of the locking lever 22b hooking the first tongue 11 may be pulled while the connection rod strap 30 is pulled by the downward movement of the connection rod 31, thereby releasing the coupling of the first tongue 11 and the second tongue 14 while the locking levers 22a and 22b are pivoting about hinge parts.

Here, as the release of the tongue coupling by the pivoting operation of the locking lever, the coupling between the tongue and the locking lever, and the returning method of the push button are well known to those of skill in the art, detailed descriptions thereof will be omitted herein.

Figure 3:
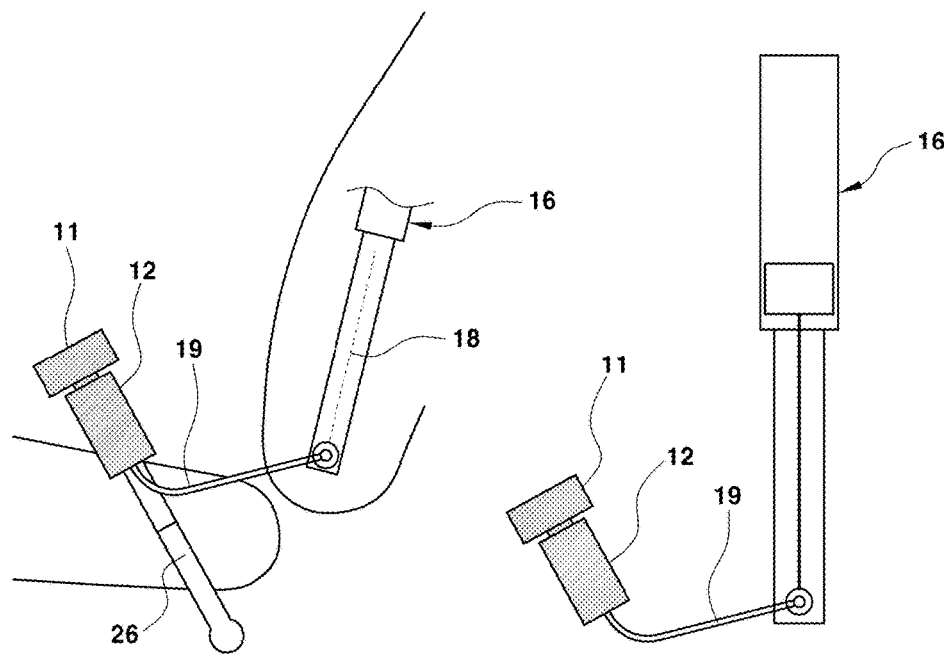
FIG. 3 is a side view illustrating states before and after dual tongue/buckle separation of a seat belt according to an embodiment of the present inventive concept.
Figure 3:
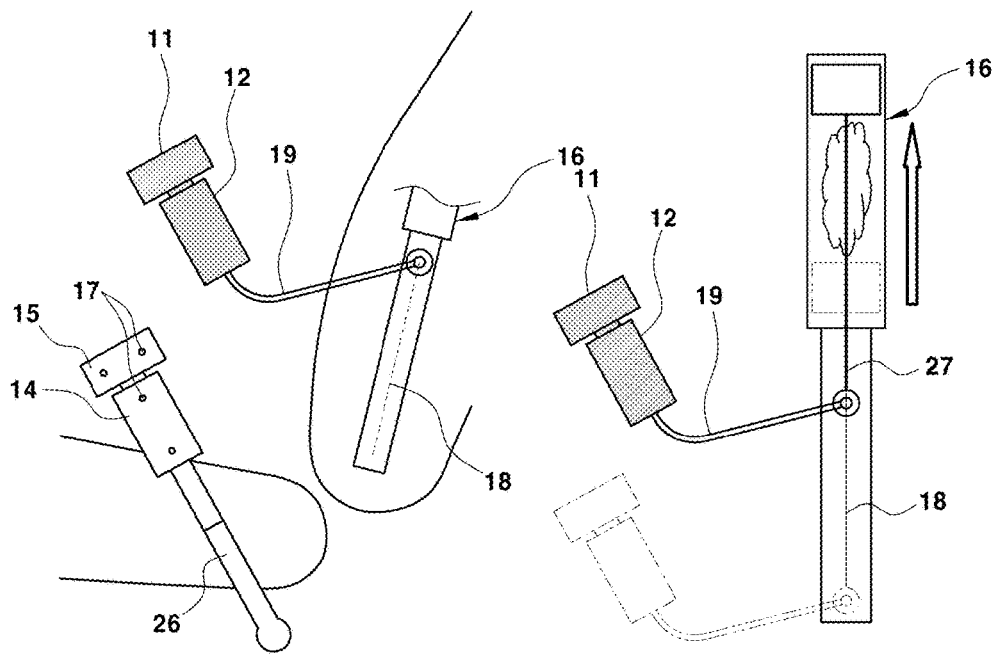

FIG. 3 is a side view illustrating states before and after dual tongue/buckle separation of a seat belt according to an embodiment of the present inventive concept.

As shown in FIG. 3, the actuator 16 may be disposed in the seat back 110, and the piston rod 27 of the actuator 16 may be connected to the first buckle 12 through the strap 19.

Here, the actuator 16 may explosively retract the piston rod 27 by a collision signal, and a pneumaticactuator that retracts the piston rod 27 up may be employed.

For example, when an accident occurs, the seat belt may be inversely rolled so as to fix a passenger to the seat. Simultaneously, a gas chamber such as an anchor pre-tensioner that is being currently applied to vehicles may be disposed at the side of the seat back, and the strap 19 connected to the first buckle 12 may be upwardly pulled upon explosion.

Here, any method in which the actuator is explosively operated by the collision signal can be adopted without a special limitation if ordinarily known in the art.

Accordingly, when the actuator 16 operates upon vehicle crash, an upwardly pulling force may be applied to the strap 19, the first buckle 12 connected to the strap 19, and the first tongue coupled to the first buckle 12 due to the movement of the piston rod 27. Due to the pulling force, the molding pin 17 connecting between the first tongue 11 and the second tongue 14 and between the first buckle 12 and the second buckle 15 may be broken.

At the same time as the breakage of the molding pin 17, the first tongue 11 and the first buckle 12 may be separated from the second tongue 14 and the second buckle 15 and may move upward. Simultaneously, the passenger fixing location of the first webbing 10 hung on the first tongue 14 may move up, and thus the movement of the upper body of a passenger may be restricted.

Figure 4:
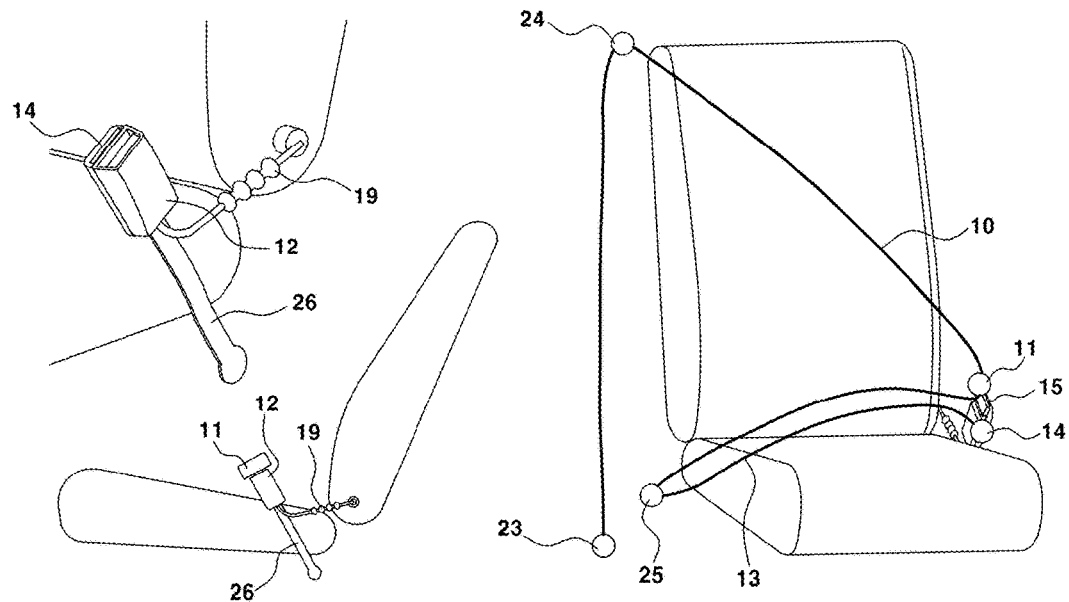
FIG. 4 is perspective and front views illustrating a state before the operation of a seat belt according to an embodiment of the present inventive concept.
Figure 5:
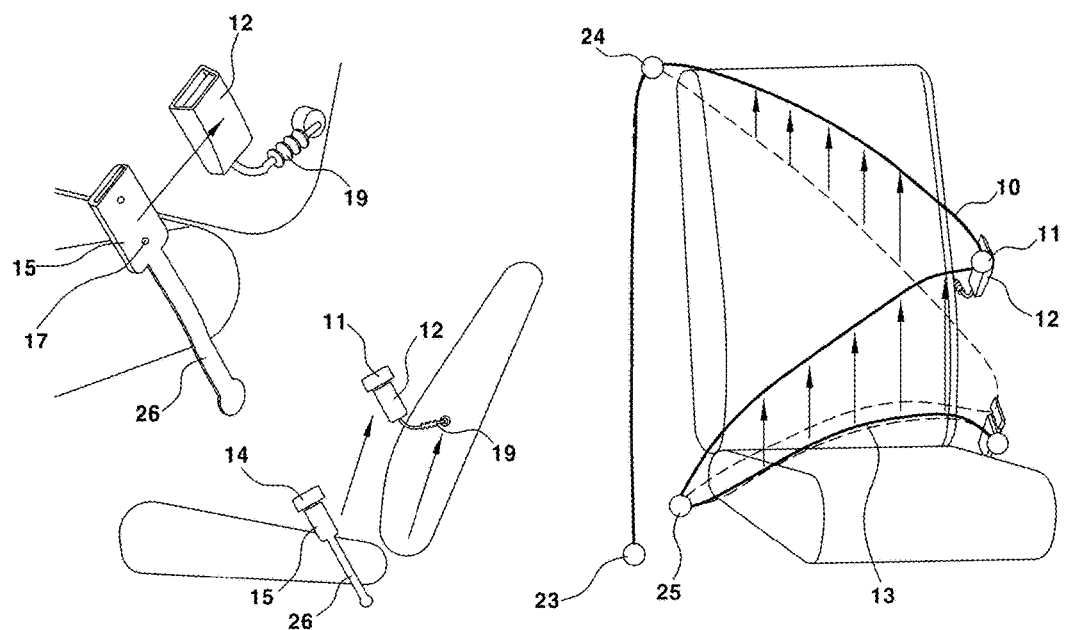
FIG. 5 is perspective and front views illustrating a state after the operation of a seat belt according to an embodiment of the present inventive concept.
Figure 6A:
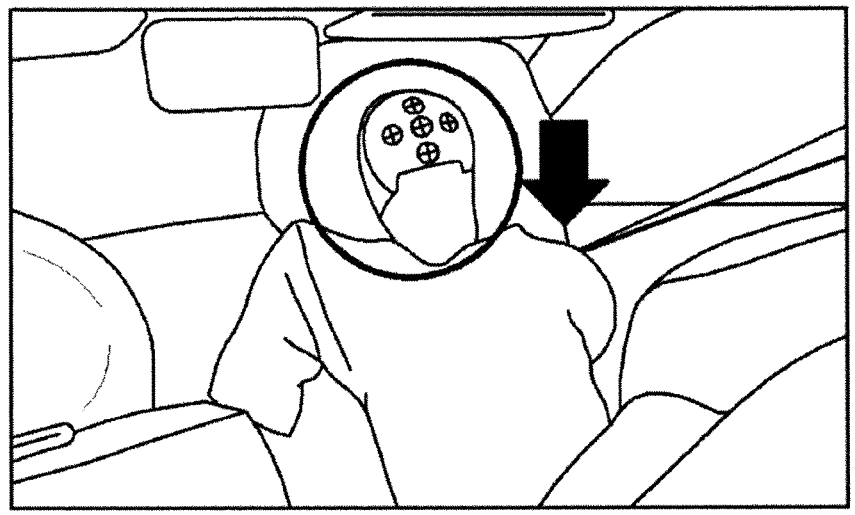
FIG. 6A and FIG. 6B are photographs illustrating the behavior of a dummy upon new oblique crash of a current three-point seat belt type.
Figure 6B:
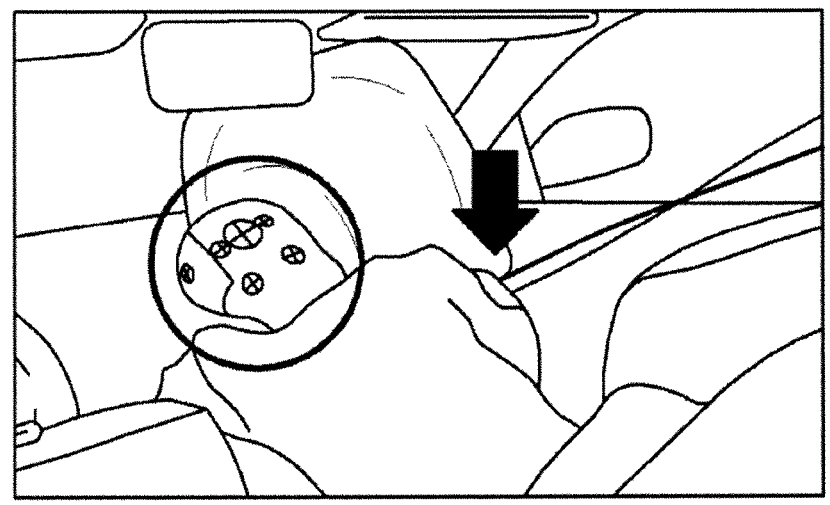

FIGS. 4 and 5 are perspective and front views illustrating states before and after the operation of a seat belt according to an embodiment of the present inventive concept.

As shown in FIGS. 4 and 5, the seat belt may include two webbings, i.e., a first webbing 10 and a second webbing 13. The first webbing 10 and the second webbing 13 can together restrict the movement of the upper body of a passenger.

For example, the first webbing 10 may upwardly extend from a retractor 23 and may pass through a D-ring 24. Thereafter, the first webbing 10 may downwardly extend to the first tongue 11, and then may be connected to a lower anchor 25 disposed at the side of the retractor 23, covering the chest and abdomen of a passenger and restricting the movement of the upper body of a passenger.

Also, the second webbing 13 may extend from the lower anchor 25 at the side of the retractor 23, and may be connected to the second tongue 14, covering the abdomen of a passenger and restricting the movement of the abdomen of a passenger.

Also, similarly to the three-point belt, the first tongue 11 and the second tongue 14 connected to the first webbing 10 and the second webbing 13 may be coupled to and decoupled from the first buckle 12 and the second buckle 15 while being coupled together during normal operation. However, when an accident occurs and a certain load is applied, the molding pin 17 may be broken and thus the first tongue 11 and the second tongue 14 may be separated from each other.

Accordingly, upon a vehicle collision, and in particular, upon an oblique crash, the strap 19, the first buckle 12, and the first tongue 11 may be separated and upwardly pulled by the actuator 16, and simultaneously, the first webbing 10 may also be upwardly pulled to cover the upper portion of the upper body of a passenger.

That is, the first tongue 11 and the first buckle 12 may move upwardly and reinforce the restriction of the movement of the upper body of a passenger while the second tongue 14 and the second buckle 15 maintain their original locations. Thus, the restriction of the movement of the abdomen of a passenger can be maintained similarly to that of a typical three-point belt, and thus a stabler belt restriction region can be secured than a four-point belt.

Thus, the present inventive concept provides excellent performance in restricting the lateral movement of a passenger by applying a dual tongue/buckle type to the seat belt. Also, the present inventive concept complies with new North American safety regulations, and in addition, it can improve the safety of occupants upon an oblique crash.

A seat belt for a vehicle according to an embodiment of the present inventive concept has the following advantages.

First, because a buckle part separates and the webbing of the seat belt upwardly moves so as to restrict the movement of the shoulder of a passenger upon an oblique crash, the lateral movement of a passenger can be effectively restricted, thereby preventing injury to a passenger.

Second, the present inventive concept can provide an innovative solution for injury prevention for a passenger seat that satisfies new North American oblique crash-related regulations, and thus can better comply with the new safety regulations.

Third, the present inventive concept improves lateral movement control upon existing side collision and other collisions in addition to complying with the new safety regulations.

Fourth, compared to a four-point belt, because the structure and exterior of a current three-point belt can be more easily maintained, it is advantageous for customer intimacy and marketability maintenance (four-point belts require extensive modification in the design of interiors and related parts).

The inventive concept has been described in detail with reference to exemplary embodiments thereof. However, it will be appreciated by those skilled in the art that changes may be made in these embodiments without departing from the principles and spirit of the inventive concept, the scope of which is defined in the appended claims and their equivalents.

What is claimed is:

1. A seat belt for a vehicle, comprising:
   a first tongue coupled to a first webbing, the first webbing configured to cover portions of a shoulder, a chest, and an abdomen of a passenger;
   a first buckle coupled to the first tongue;
   a second tongue coupled to a second webbing, the second webbing configured to cover portions of the abdomen of the passenger;
   a second buckle coupled to the second tongue; and
   an actuator configured to upwardly pull the first tongue and the first buckle,
   wherein the first buckle is coupled to the second buckle; and
   upon a collision of the vehicle, the actuator operates to separate the coupling between the first buckle and the second buckle; and the first webbing moves upward, configured to restrict a movement of an upper body of the passenger.

2. The seat belt of claim 1, wherein the first tongue and the first buckle are coupled to the second tongue and the second buckle by a molding pin disposed between the first buckle and the second buckle, and when a sufficient force is applied, the molding pin breaks, separating the first tongue and the first buckle from the second tongue and the second buckle.

3. The seat belt of claim 1, wherein the first buckle is connected to a strap extending from a piston rod of the actuator, such that the first tongue and the first buckle are pulled by the strap when the actuator operates.

4. The seat belt of claim 1, wherein the second buckle comprises a push button mounted therein, the push button configured to release the first tongue and the second tongue when the push button is pushed.

5. The seat belt of claim 4, further comprising a first locking lever configured to couple to the first tongue and a second locking lever configured to couple to the second tongue, wherein the push button is configured to release the tongues from the locking levers when the push button is pushed.

6. The seat belt of claim 1, wherein the first webbing is configured to extend from a retractor through a D-ring and the first tongue to a lower anchor disposed on the same side of the vehicle as the retractor.

7. The seat belt of claim 6, wherein the second webbing is configured to extend from the lower anchor to the second tongue.

8. The seat belt of claim 1, wherein the actuator comprises a pneumatic actuator that expands rapidly upon a collision signal.

* * * * *